Aug. 19, 1969

JAMES E. WEBB
ADMINISTRATOR OF THE NATIONAL AERONAUTICS
AND SPACE ADMINISTRATION
HYDROFORMING TECHNIQUES USING EPOXY MOLDS 3,461,700

Filed Dec. 27, 1966

INVENTOR.
ROBERT N. HANSON

BY
ATTORNEYS

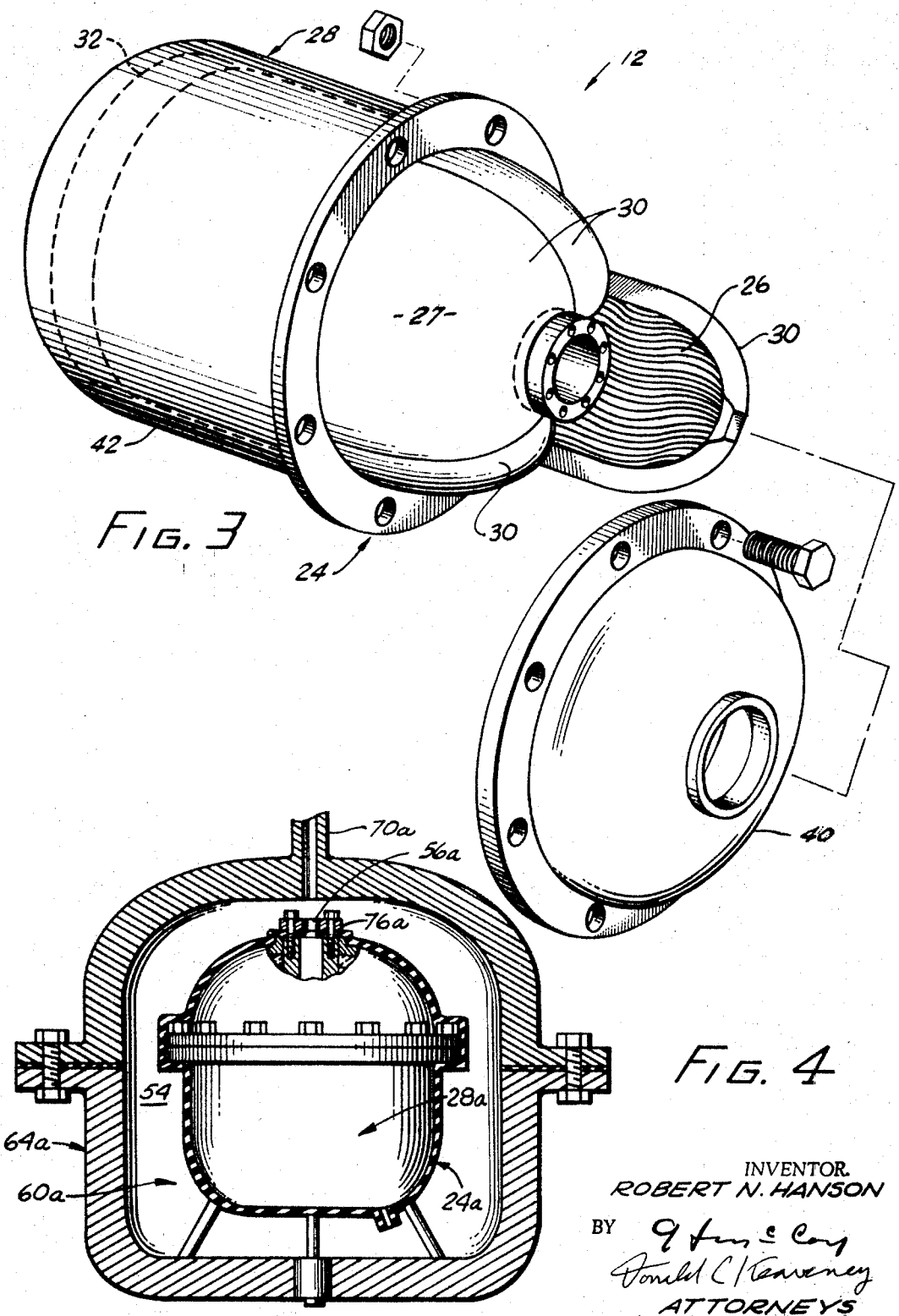

United States Patent Office 3,461,700
Patented Aug. 19, 1969

3,461,700
HYDROFORMING TECHNIQUES USING EPOXY MOLDS
James E. Webb, Administrator of the National Aeronautics and Space Administration, with respect to an invention of Robert N. Hanson, Covina, Calif.
Filed Dec. 27, 1966, Ser. No. 605,091
Int. Cl. B21d 28/18, 22/10
U.S. Cl. 72—61                                  2 Claims

ABSTRACT OF THE DISCLOSURE

A hollow workpiece is disposed inside a thin-walled die. The die is inside a pressure vessel. Fluid pressure is applied to the inside of the workpiece and to the outside of the die so that pressure forces across the die are balanced. The interior of the workpiece is sealed from the interior of the pressure vessel. Additionally, the whole die is sealed in a hermetic pliable bag to prevent leakage of fluid from the pressure vessel through the die into the space between the workpiece and the die. A one way valve is provided in the bag for attachment to a vacuum pump.

---

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates generally to the art of cold forming metals and other work materials. More particularly, the invention relates to an improved hydroforming method and apparatus.

In a typical hydroforming operation, as it is presently practiced, a preformed work shell, such as a tank, for example, is enclosed within a hollow forming die having an internal work forming surface. The work shell is then internally pressurized by introducing a working fluid, such as water, under pressure into the interior of the shell. The resulting fluid pressure within the work shell deforms or stretches the wall of the shell outwardly into conforming relation with the work forming surface of the forming die. In some cases, the forming die is an essentially unitary structure comprising a vessel or container having a wall, the inner surface of which defines the work forming surface of the die. In other cases, the forming die is a composite structure having an inner mold which defines the work forming surfaces of the die, and an outer vessel or container which surrounds and reinforces the inner mold. The mold may be segmented for ease of initial appplication about the work shell and subsequent removal from the finished work product.

The working fluid pressures involved in hydroforming are relatively high and create large outward forces on the forming die. These forces, in turn, produce hoop stresses in the wall of the forming die which tend to cause this wall to stretch or creep and thereby enlarge the forming die cavity. Any creep which does occur in the forming die, therefore, unless compensated for in the design of the die, results in an oversize or otherwise improperly formed work product. Moreover, stretching of the outer retaining wall or container of a composite forming die structure having a segmented inner mold will permit separation of the mold segments, thus resulting in further malformation of the work product. The foregoing difficulties are avoided in the existing hydroforming dies either by making the die walls sufficiently thick to reduce the unit stress, and thereby creep, in these walls to an acceptable level, or by making the die cavity slightly undersize and designing a predetermined creep capability into the die, such that the latter will creep to the proper die cavity size and shape under pressure.

These methods of counteracting or compensating creep or stretch in a hydroforming die have certain disadvantages. Among the foremost of these disadvantages are high forming die material and fabrication costs and great forming die weight which renders the forming die difficult to handle. The higher the hydroforming pressures involved, of course, the more serious these disadvantages become.

It is evident at this point, therefore, that a definite need exists for an improved hydroforming technique which is not subject to the above noted and other disadvantages of the existing hydroforming techniques.

It is a general object of the present invention to provide such an improved hydroforming technique.

A more specific object of the invention is to provide an improved hydroforming method and apparatus wherein the forming die is subjected to a fluid pressure approximating and opposing the working fluid pressure active on the die during the hydroforming operation, thus to substantially balance the forces on and thereby minimize or eliminate hoop stress and resulting creep in the wall of the forming die.

Another object of the invention is to provide an improved hydroforming method and apparatus of the character described which permits the use of a relatively thin-walled, lightweight forming die which is economical to fabricate, easy to handle, and otherwise ideally suited for hydroforming applications.

A further object of the invention is to provide an improved hydroforming method and apparatus of the character described which are particularly useful in hydroforming applications involving the use of a segmented mold and which are effective to minimize or eliminate separation of the mold segments during the hydroforming operation.

Other objects, advantages, and features of the invention will become readily evident as the disclosure proceeds.

With these and such other objects in view, the invention consists in the construction, arrangement, and combination of the various parts of the invention whereby the objects contemplated are attained, as hereinafter set forth, pointed out in the appended claims, and illustrated in the accompanying drawings.

In these drawings:

FIGURE 3 is an enlarged exploded perspective view of the hydroforming apparatus; and FIGURE 4 is a section through a modified hydroforming apparatus according to the invention.

Briefly, the hydroforming method and apparatus of the invention involve the use of a hollow hydroforming die having a work forming surface. This forming die is adapted to receive a hollow preformed work shell in an initial forming position wherein the work forming surface of the forming die and one surface of the work shell are disposed in confronting relation. During the hydroforming operation, the work shell is pressurized with a first working fluid, referred to herein as a forming fluid, to deform the shell toward and into forming relation with the work forming surface of the forming die, and the forming die is pressurized in opposition to the forming fluid pressure with a second working fluid, referred to herein as a balancing fluid, under a pressure approximating the forming fluid pressure to substantially balance the fluid pressure forces across the forming die. Creep stress in the forming die is thus minimized or virtually eliminated, thereby permitting the use of a relatively thin-walled, lightweight forming die. In the event the forming die is a composite die structure including a segmented mold, such balancing of the fluid pressure across the die are also effective to minimize or virtually eliminate separation of the mold segments.

Figure 1:
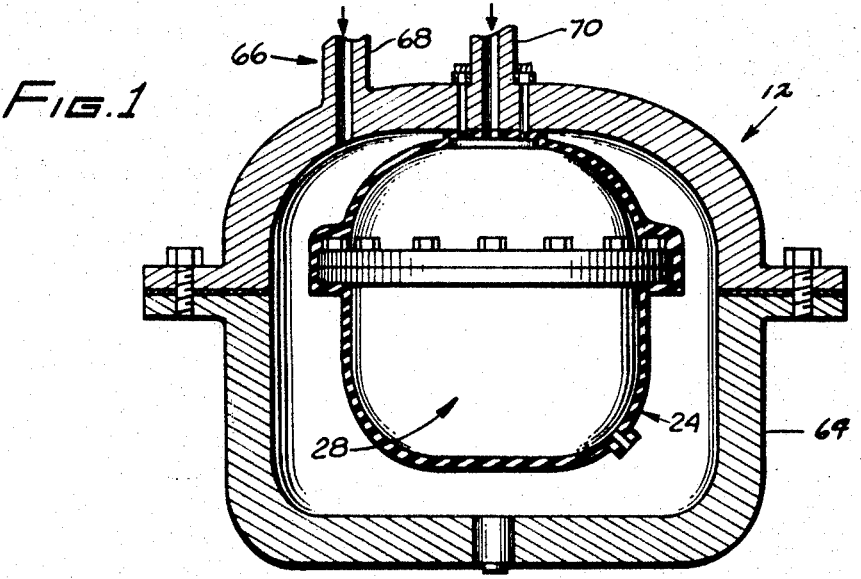
FIGURE 1 is a section through hydroforming apparatus according to the invention showing the actual forming die in side elevation.
Figure 2:
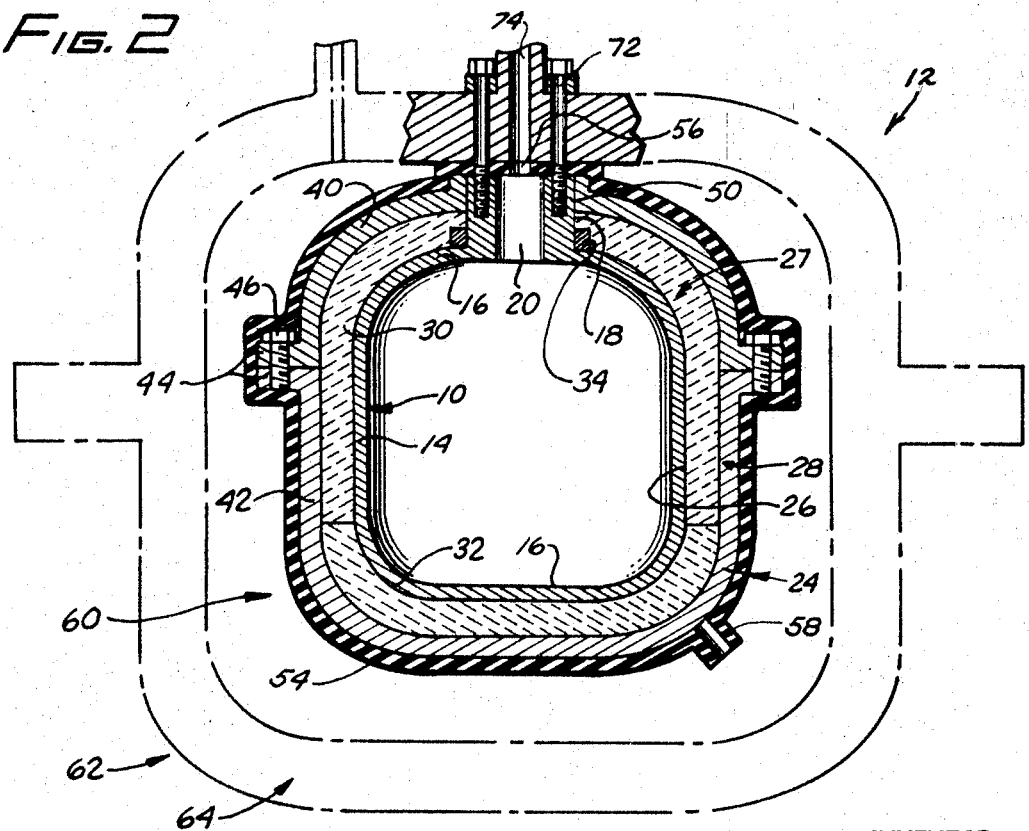
FIGURE 2 is an enlarged section similar to FIGURE 1 showing the forming die in section.

Referring now to FIGURES 1-3 of the drawings, there is illustrated a preformed work shell 10 to be hydroformed and hydroforming apparatus 12 according to the invention for hydroforming the shell. The particular work shell 10 shown is a tank having a wall including a cylindrical side wall portion 14, end wall portions 16, and a neck 18 extending coaxially from one end wall portion. Passing through this neck is an opening or passage 20 to the tank interior. In the particular hydroforming application illustrated, the wall of the work shell or tank is to be embossed with a multiplicity of circumferentially spaced, undulate or wave-shaped reinforcing corrugations which extend axially along the cylindrical side wall portion 14 and radially across the end wall portions 16 of the tank. The illustrated hydroforming apparatus 12 is designed to impress or emboss these corrugations in the tank.

Hydroforming apparatus 12 comprises a hollow female forming die 24 having an inner cavity bounded by a work forming surface 26 which is contoured, as shown in FIGURE 3, to form or emboss the desired work tank corrugations. The particular forming die 24 illustrated has a composite die structure including an innersegmented mold 27 which surrounds the work shell or tank 10 and an outer retaining vessel or container 28 which surrounds the mold. Mold 27 is split axially along a number of uniformly circumferentially spaced parting planes containing the central axis of the mold and circumferentially along a parting plane normal to the axis to define a number of separable mold sections or segments 30 and 32. The mold segments 30 have similar generally sector shapes and are disposed with their confronting longitudinal parting edges or faces in contact to form the upper half of the mold 27. The mold segment 32 is generally dish-shaped and seats against the lower parting edges or faces of the mold segments 30 to form the lower half of the mold 24. The mold is completed by an upper split ring 34 which seats in recesses in the upper ends of the mold segments 30, as shown. The forming mold 27 can be constructed of any suitable material either metallic or non-metallic. Preferably, however, the mold material comprises a plastic, such as an epoxy.

The outer forming die retaining vessel or container 28 has a thin-walled construction and includes separable upper and lower sections 40 and 42. These container sections have abutting flanges 44 which are releasably joined by bolts 46. Extending centrally through the upper container section 40 is an opening 50 for receiving the neck 18 of the work tank 10.

At the outset of a hydroforming operation, the work shell or tank 10 is sealed within the forming die 24. This is accomplished by separating the sections 40, 42 of the forming die container 28 and removing the upper mold segments 30. The work tank 10 is then inserted into the lower container section 42 in such a way that the neck 18 of the tank is exposed at the open upper end of the latter container section and the opposite end of the tank seats in the lower mold segment 32. Thereafter, the upper mold segments 30 and the split mold ring 34 are placed about the work tank 10, as shown. Finally, the upper forming die container section 40 is reassembled on the lower container section 42 in such a way that the neck 18 of the tank protrudes through the opening 50 in the upper section.

As will appear presently, it is necessary to seal the forming die 24 against leakage of fluid into the region between the die and the work shell 10. According to the preferred practice of the invention, this sealing function is accomplished by a pliable vacuum bladder or bag 54 for containing the forming die. Vacuum bag 54 may be constructed of rubber or other suitable pliable material.

The bag has an opening 56 which may be stretched to permit the forming die and its contained work shell 10 to be inserted into the bag. The bag is sealed about the forming die in a manner to be explained presently. The wall of the vacuum bag has a fitting 58, containing a check valve (not shown), through which the bag may be evacuated to draw the bag into close conforming relation with the outer surface of the forming die container 28. The assembly 60, comprising the work shell 10, forming die 24, and vacuum bag 54 is hereinafter referred to, for convenience, as a hydroforming work assembly, or simply a work assembly.

The present hydroforming apparatus 12 further includes a hydroforming fixture 62 for internally and externally pressurizing the hydroforming work assembly 60. Fixture 62 comprises a hermetic pressure vessel 64 for receiving the work assembly and means 66 for pressurizing the interior of the hydroforming vessel 64, about the work assembly, and the interior of the work shell 10 with working fluid under equal or approximately equal pressure. This working fluid may be a gas or a liquid, depending upon the work material being hydroformed. In most cases, however, the working fluid is a liquid, such as water. As noted earlier, the working fluid which acts on the work shell 10 is referred to herein as forming fluid and the working fluid which acts on the outside of the work assembly 10 is referred to as balancing fluid. The forming fluid pressure within the work shell 10 acts outwardly on the shell wall to deform or stretch the latter outwardly into conforming relation with the inner work forming surface 26 of the forming die 24. The balancing fluid pressure on the outside of the hydroforming work assembly 60 acts inwardly on the forming die container 28 in opposition to the internal forming fluid pressure. The fluid pressure forces across the container 28 are thereby substantially balanced, whereby hoop stress in the container wall, and hence the tendency for this wall to stretch or creep during hydroforming, are minimized or virtually eliminated irrespective of the container wall thickness. The forming die container 28 is thus effective to retain the segments 30, 32 of the inner forming mold 27 against separation under the force of the internal forming fluid pressure within the work shell 10. It is evident at this point, therefore, that the present hydroforming apparatus permits the use of a forming die 24 with a relatively thin-walled, lightweight container 28 for retaining the inner mold segments 30, 32 in proper work forming relation during the hydroforming operation.

In this regard, it is significant to note that the present invention, in effect, transfers the pressure vessel requirements from the inner forming die 24 to the outer pressure vessel 64 of the hydroforming apparatus. Any creep or stretch occasioned by the pressurized working fluid which is employed in the apparatus occurs in the wall of this outer vessel, rather than in the wall of the die container 28, and thus does not affect the quality of the finished work product. The lightweight construction of the forming die permitted by the present invention renders the die easy to handle and capable of producing high precision work products. The outer container 28 of the hydroforming die may be constructed of any suitable metallic or non-metallic material but is preferably constructed of fiber glass.

The drawings illustrate two alternative methods of feeding pressurized, working fluid to the interior of the work shell 10 and to the interior of the hydroforming vessel 64 about the hydroforming work assembly 60. In FIGURES 1-3 the pressurizing means 66 comprise a conduit 68 for conveying balancing fluid under pressure to the interior of the vessel 64 and a conduit 70 for conveying forming fluid to the interior of the work shell 10. These fluids may be obtained from a common pressurized fluid source (not shown). In FIGURES 1-3 the work assembly 60 is secured to the hydroforming vessel 64 by bolts 72 which are threaded in the work shell neck 18 in such a way that the mouth of the vacuum bag 54, about its opening 56, is clamped between the work shell 10 and the vessel 64, about the work shell opening 20, thus to provide a seal between the work shell and vessel. The passage 20 in the work shell 10 communicates with the passage 74 in the forming fluid conduit 70.

In FIGURE 4, the work assembly 60a is placed within the hydroforming vessel 64a in such a way that the interior of the work shell opens to the interior of the vessel, as shown. The vessel 64a has a single working fluid inlet conduit 70a. Accordingly, the pressurized working fluid entering through the conduit 70a flows both to the interior of the work shell to provide a forming fluid pressure in the shell, and the interior of the hydroforming vessel about the work assembly 60a to provide a balancing fluid pressure about the assembly. Hydroforming of the work shell with balanced fluid pressure across the forming die 24a is thus achieved. The work assembly is sealed by a washer 76a which is bolted to the neck of the work shell, in such a manner as to clamp the mouth of the bag, about its opening 56a, to the work shell neck. The work assembly 60a is identical to the work assembly 60 except for this different method of sealing the assembly 60a. The hydroforming apparatus of FIGURES 1-3 is superior to that of FIGURE 4 for the reason that the pressure of the working fluid entering through the conduits 68 and 70 may be equalized to balance the fluid pressure forces across the forming die 24, as in the apparatus of FIGURE 4, or the presence of the balancing fluid fed to the outside of the work assembly 60 may be made slightly greater than the pressure of the forming fluid fed to the interior of the work shell 10, thus to create a slight excessive inward force on the forming die for retaining the mold segments 30, 32 in firm contact during the hydroforming operation.

While there have been shown and described and pointed out the fundamental novel features of the invention as applied to preferred embodiments, it will be understood that various omissions and substitutions and changes in the form and details of the device illustrated and in its operation may be made by those skilled in the art without departing from the spirit of the invention; therefore, it is intended that the invention be limited only as indicated by the scope of the following claims.

What is claimed is:

1. Hydroforming apparatus for shaping a preformed hollow shell-like work member having internal and external surfaces, comprising:
 a pressure vessel;
 a hollow forming die member mounted within said vessel having internal and external surfaces including a work forming surface, said die member being adapted to receive said work member in an initial forming position wherein one member surrounds the other member to define a first chamber between the outer member and the wall of said vessel and a second chamber within the inner member and a region between confronting surfaces of said members;
 means for pressurizing said chambers with working fluid under substantially equal pressure to deform said work member into forming relation with said work forming surface of said forming die member in such a manner that the fluid pressure forces across said die member are substantially balanced; and
 a pliable hermetic bag adapted to envelope and to be sealed about said members outside of said die member in such a manner as to prevent fluid leakage into the region between said confronting surfaces of said members.

2. Hydroforming apparatus for shaping a hollow preformed work shell having a wall opening, comprising:
 a pressure vessel;
 a hollow forming die mounted within said vessel for receiving said work shell in an initial forming position wherein said work shell is disposed within and surrounded by said forming die;
 said forming die having an internal work forming surface confronting the outer surface of said work shell;
 pressurizing means for conveying working fluid under substantially equal pressure to the interior of said pressure vessel about said forming die and to the interior of said work shell when said shell is positioned within said forming die to deform said work shell outwardly into forming relation with said work forming surface of said forming die in such a manner that the fluid pressure forces across said forming die are substantially balanced; and
 a pliable bag enclosing said forming die and having an opening to register with said work shell opening, means for sealing said bag to said work shell about said work shell bag opening, and means for evacuating the region between said forming die and bag.

References Cited

UNITED STATES PATENTS

| | | | |
|---|---|---|---|
| 430,816 | 6/1890 | Webster | 72—61 |
| 667,525 | 2/1901 | Huber | 72—60 |
| 2,410,857 | 11/1946 | Ahern | 72—60 |
| 2,728,317 | 12/1955 | Clevenger et al. | 72—60 |
| 3,274,813 | 9/1966 | Aleck | 72—62 |
| 3,379,043 | 4/1968 | Fuchs | 72—60 |

RICHARD J. HERBST, Primary Examiner

U.S. Cl. X.R.

29—421